United States Patent
Benisty

(10) Patent No.: US 10,564,872 B2
(45) Date of Patent: Feb. 18, 2020

(54) SYSTEM AND METHOD FOR DYNAMIC ALLOCATION TO A HOST OF MEMORY DEVICE CONTROLLER MEMORY RESOURCES

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/023,767

(22) Filed: Jun. 29, 2018

(65) Prior Publication Data

US 2020/0004445 A1  Jan. 2, 2020

(51) Int. Cl.
*G06F 3/06* (2006.01)
*G06F 12/02* (2006.01)
*G06F 9/50* (2006.01)

(52) U.S. Cl.
CPC ............ *G06F 3/0631* (2013.01); *G06F 3/061* (2013.01); *G06F 3/0632* (2013.01);
(Continued)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885;
(Continued)

(56) References Cited

U.S. PATENT DOCUMENTS 7,024,514 B2 *  4/2006  Mukaida ............. G06F 12/0246
                                                    711/103
9,384,093 B1   7/2016  Aiello
(Continued)

OTHER PUBLICATIONS

An Empirical Evaluation of NVM Express SSD; Son et al.; International Conference on Cloud and Autonomic Computing; Sep. 21-25, 2015 (Year: 2015).*
(Continued)

*Primary Examiner* — Daniel C. Chappell
(74) *Attorney, Agent, or Firm* — Brinks Gilson & Lione

(57) ABSTRACT

Systems and methods for a non-volatile memory (NVM) system to allocate controller memory buffer resources to multiple host functions based on host input are disclosed. The NVM system may include a NVM controller configured to advertise total available controller buffer resources to a host. The NVM system includes host writable controller buffer allocation registers for receiving host selected amounts of available controller buffer resources, where a physical function on the host selects a portion of the buffer resources for itself and also selects portions of NVM system controller buffer resources for each other of the secondary, or virtual, host functions also in communication with the NVM system. In this manner, a host in a non-volatile memory express (NVMe) system may dynamically designate controller buffer resources for itself and all other hosts of the NVM system rather than relying on a static NVM system default distribution of controller buffer resources.

19 Claims, 11 Drawing Sheets

(52) U.S. Cl.
CPC ......... *G06F 3/0656* (2013.01); *G06F 3/0664* (2013.01); *G06F 3/0688* (2013.01); *G06F 9/5016* (2013.01); *G06F 12/0246* (2013.01)

(58) Field of Classification Search
CPC ......... G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 9,501,245 | B2* | 11/2016 | Hussain | G06F 3/0664 |
| 9,953,694 | B2* | 4/2018 | Querbach | G11C 11/40603 |
| 10,007,443 | B1* | 6/2018 | Rajadnya | G06F 3/0613 |
| 10,203,912 | B2* | 2/2019 | Jun | G06F 3/0688 |
| 10,268,612 | B1* | 4/2019 | Bshara | G06F 12/1009 |
| 2013/0086311 | A1 | 4/2013 | Huang et al. | |
| 2014/0281040 | A1* | 9/2014 | Liu | G06F 9/50 710/3 |
| 2015/0317088 | A1* | 11/2015 | Hussain | G06F 3/0664 711/103 |
| 2016/0224248 | A1* | 8/2016 | Choi | G06F 9/45558 |
| 2016/0291866 | A1 | 10/2016 | Olcay et al. | |
| 2017/0024166 | A1* | 1/2017 | Singh | G06F 12/0246 |
| 2017/0242722 | A1* | 8/2017 | Qiu | G06F 3/061 |
| 2017/0262380 | A1* | 9/2017 | Yoshida | G06F 12/1009 |
| 2018/0217951 | A1* | 8/2018 | Benisty | G06F 13/1642 |
| 2019/0138209 | A1* | 5/2019 | Benisty | G06F 3/061 |
| 2019/0146684 | A1* | 5/2019 | Benisty | G06F 3/0613 |

OTHER PUBLICATIONS

Disaggregation and Sharing of I/O Devices in Cloud Data Centers; Suzuki et al.; IEEE Transactions on Computers, vol. 65, iss. 10, pp. 3013-3026; Oct. 1, 2016 (Year: 2016).*

NVMMU: A Non-volatile Memory Management Unit for Heterogeneous GPU-SSD Architectures; Zhang et al.; International Conference on Parallel Architecture and Compilation; Oct. 18-21, 2015 (Year: 2015).*

NVM Express, Revision 1.2, Nov. 3, 2014, pp. 1-205.

* cited by examiner

FIG. 9

| Bit | Type | Reset | Description |
|---|---|---|---|
| 31:12 | RW | | Size [Size of Controller Memory Resource (CMB or PMR) as a multiple of Size Unit] |
| 11:08 | RW | | Size Units (Value equal to granularity of Size field, e.g. 4KB, 64KB, 1MB, 16MB and or other selectable unit of size) |

FIG. 10

| Field | Width [Bits] | Description |
|---|---|---|
| CMBS | 16 | CMB Size |
| CMBO | 16 | CMB Offset |
| PMRS | 16 | PMR Size |
| PMRO | 16 | PMR Offset |

SYSTEM AND METHOD FOR DYNAMIC ALLOCATION TO A HOST OF MEMORY DEVICE CONTROLLER MEMORY RESOURCES

BACKGROUND

NVM Express (NVMe) is a standard for accessing non-volatile storage media attached via a Peripheral Component Interconnect Express (referred to herein as PCI express or PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). NVMe implements a paired submission queue and completion queue mechanism, with host software on the host device placing commands into the submission queue and are fetched by the memory device for execution. Completions of commands are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 9 is an embodiment of a format for NVMe registers configured to allow the storage device to advertise a total amount of shared resource space to a host upon initialization of the storage device.

FIG. 10 illustrates an embodiment of a mapping table format for entries in the controller buffer manager to map physical function and virtual function data to the correct controller memory buffer (CMB) or persistent memory region (PMR) in controller memory.

DETAILED DESCRIPTION

Overview

Figure 1A:
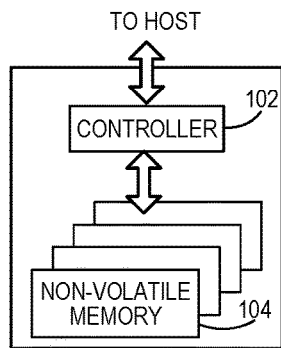
FIG. 1A is a block diagram of an exemplary non-volatile memory system.

The non-volatile memory express (NVMe) standard is based on a paired submission and completion queue mechanism. Commands are placed by host software into a submission queue. Completions are placed into the associated completion queue by the controller of the non-volatile memory (NVM) memory device. A host may have multiple pairs of submission and completion queues for different types of commands. Responsive to a notification by the host device, the memory device fetches the command from the submission queue. Thereafter, the memory device processes the command (e.g., the memory device performs internal command selection, executes the command (such as performing a write or a read), etc.). After processing the command, the memory device places an entry on the completion queue, with the entry indicating that the execution of the command has completed. The memory device then generates an interrupt to the host device indicating that an entry has been placed on the completion queue. The host device reviews the entry on the completion queue and then notifies the memory device that the entry on the completion queue has been reviewed.

In general, submission and completion queues are allocated in host memory (on the host) where each queue might be physically located contiguously or non-contiguously in the host memory. However, a controller memory buffer (CMB) feature, such as is supported in the NVMe standard, enables the host to place submission queues, completion queues, physical page region (PRP) lists, scatter gather list (SGL) segments and data buffers in the memory device controller memory rather than in memory on the host.

As described in greater detail below in FIG. 6, the CMB 600 on a controller may be supplemented with a second type of controller memory known as a persistent memory region (PMR) 602. The PMR 602 is an optional region of general purpose read/write persistent memory that may be used for a variety of purposes. The address range of the PMR 602 is defined by a PCIe base address register (BAR) and consumes the entire address region exposed by the BAR. The PMR 602 supports the required features of the PCIe programming model (i.e., it in no way restricts what is otherwise permitted by PCIe). The contents of the PMR persists across PMR disables, controller and NVM subsystem resets and power cycles. The PMR 602 is a separate region of controller memory that may be implemented in non-volatile memory 506 and cached in DRAM 522 or SRAM in different embodiments The CMB/PMR resources on the memory device may be helpful, for example in the enterprise storage market this feature may directly affect performance especially in a PCIe fabric topology. In addition, use of CMB/PMR resources by a host may reduce the amount of storage that is implemented in the host memory.

A recent version of the NVMe standard (version 1.3) introduces the NVMe virtualization environment. Virtualized environments may use an NVM system with multiple controllers to provide virtual or physical hosts (also referred to herein as virtual or physical functions) direct input/output (I/O) access. The NVM system is composed of primary controller(s) and secondary controller(s), where the secondary controller(s) depend on primary controller(s) for dynamically assigned resources. A host may issue the Identify command to a primary controller specifying the Secondary Controller List to discover the secondary controllers associated with that primary controller. The PCI-SIG Single Root I/O Virtualization and Sharing Specification (SR-IOV) defines extensions to PCI Express that allow multiple System Images (SIs), such as virtual machines running on a hypervisor, to share PCI hardware resources. A benefit of SR-IOV is that it eliminates the hypervisor from participating in I/O operations which may be a significant factor limiting storage performance in some virtualized environments and allows direct SI access to PCI hardware resources.

A Physical Function (PF) is a PCI Express Function that supports the SR-IOV capability, which in turn allows it to support one or more dependent Virtual Functions (VFs). These PFs and VFs may support NVM Express controllers that share an underlying NVM subsystem with multi-path I/O and namespace sharing capabilities.

In such a virtualization environment, the physical function, sometimes referred to herein as the primary function, and each virtual function is allocated its own CMB/PMR that is a portion of the total controller memory available for CMB/PMR use. As used herein, the term physical function refers to a PCIe function that supports SR-IOV capabilities where a single physical host is divided into the physical function and multiple virtual functions that are each in communication with the controller of the memory device. The terms physical function and primary function may be used interchangeably herein. Only one physical function may be associated with the memory device, however one or more different virtual functions may be associated with the memory device having the one primary function and may share various physical resources with the physical function. The physical function is aware of the capabilities and needs of the virtual functions. A PCIe extension, such as single root input/output virtualization (SR-IOV), may allow a single physical host to operate as a virtual machine with a physical function and multiple virtual functions operating as separate respective hosts to the memory device, each with separate access to the memory device through a single PCIe interface.

In the NVMe standard, the memory device controller assigns each of the primary and virtual host its own portion of the memory device CMB/PMR in a static manner. Because the NVMe standard does not provide for host adjustment of the allocation of the CMB/PMR resources, the allocation of the CMB/PMR resources may have no relation to the relative CMB/PMR needs of the physical function and the virtual function(s). While the static manner in which the memory device controller assigns CMB/PMR resources may provide some predetermined amount to the physical function and each virtual function, the memory device controller does so without actually knowing whether a specific function needs a particular amount of the CMB/PMR resources. Because the memory system controller is not aware of the particular needs of the functions on the host, the memory device controller may inadvertently waste CMB/PMR capacity on some functions, while at the same time starve other functions of the CMB/PMR resources.

Described herein are embodiments of a memory device that address problems of CMB/PMR resource management in situations, such as can be the case in a standard virtualized NVMe environment, where a physical function and virtual functions cannot adjust memory controller resource allocation. For example, in one implementation, a memory device includes dedicated memory registers and functionality to permit host configuration of controller memory space resources.

According to a first aspect, a non-volatile memory device is disclosed having a non-volatile memory with a plurality of memory cells, a communication interface configured to communicate with a host device, and a controller in communication with the non-volatile memory and the communication interface. The controller may be configured to, during an initialization phase of the non-volatile memory device, advertise to the host device a total amount of available controller memory resources on the non-volatile memory device available for use by the host device The controller may be further configured to store a controller memory resource configuration setting received from the host device, based on the total amount of available controller memory resources, during the initialization phase of the non-volatile memory device, identifying a host device determined portion of the total amount of available controller memory resources the host device reserves for host device use.

According to a second aspect, a method for a memory device to dynamically configure an amount of memory buffer resources located on the memory device for use by a host is described The method may include the memory device detecting a memory device initialization trigger, such as a power up event or a virtual management command from a virtualized host. The method may further include, in response to detecting the memory device initialization trigger, the memory device communicating to a physical function of a virtualized host a total amount of memory buffer resources on the memory device available for use by the physical function and any virtual functions in communication with the memory device. After advertising the total amount of memory buffer resources, the method may further include receiving, from the physical function, a controller memory resource configuration setting identifying both a first portion of the controller memory resources located on the memory device to be reserved for the physical function and a second portion of the controller memory resources located on the memory device to be reserved for a virtual function. The method may continue with the memory device storing the received memory resource configuration setting on the memory device identifying the first portion and the second portion, and then accessing the first portion in response to received commands identifying the physical function, and accessing the second portion in response to received commands identifying the virtual function, in accordance with the received controller memory resources configuration setting from the physical function.

In another aspect, a non-volatile memory device may include a non-volatile memory having a plurality of memory cells, a communication interface configured to communicate with a virtualized host device, and a controller. The controller may be in communication with the non-volatile memory and the communication interface, and configured to present a total amount of controller memory resources available for the virtualized host device to share between a physical function and a plurality of virtual functions supported by the virtualized host device. The controller may further be configured to store a host assigned allocation amount of the total amount of controller memory resources for each of the physical function and the plurality of virtual functions. Additionally, the controller may be configured to generate a mapping table indexed by physical function and virtual function identifiers, where the mapping table includes a size and an offset in each of a plurality of types of controller memory resources allocated by the physical function of the virtualized host device to the physical function and each of the plurality of virtual functions of the virtualized host device.

In yet another aspect, a non-volatile memory device includes a communication interface having an ingress path and an egress path and a non-volatile memory having a plurality of memory cells. The non-volatile memory further includes memory device configuration means for, during an initialization phase of the non-volatile memory device, presenting a total amount of controller memory resources available for host use to a virtualized host, and for storing host-selected allocation amounts of the total amount of controller memory resources for each of a physical function and a plurality of virtual functions of the virtualized host. Finally, the non-volatile memory device includes means for sharing the total amount of controller memory resources among the physical function and plurality of virtual functions according to the host-selected allocation amounts.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

Referring now to FIG. 1A, a block diagram illustrating a non-volatile memory system is shown. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, NVM system 100 may be a card based system, such as a secure digital (SD) or a micro secure digital (micro-SD) card. In an alternate embodiment, NVM system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
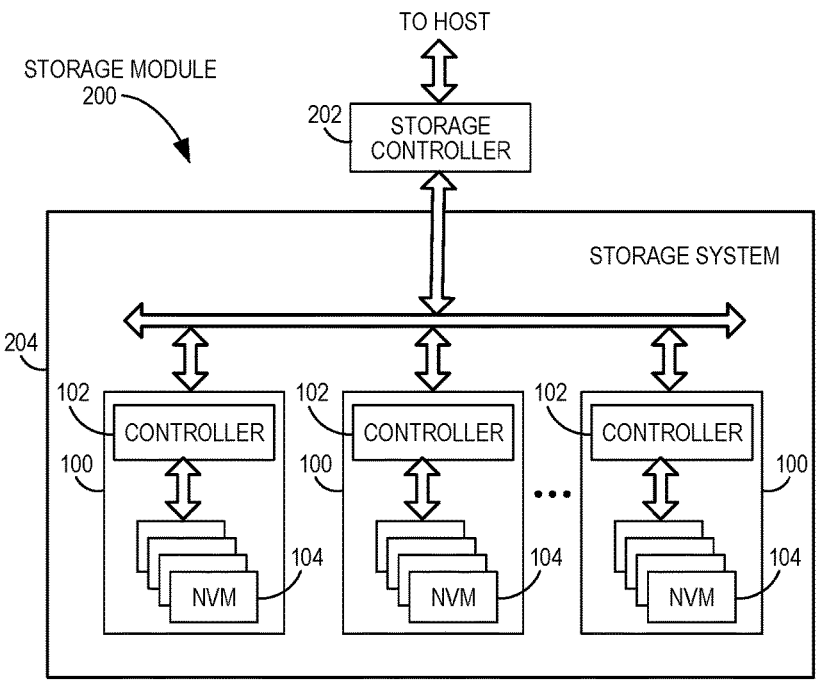
FIG. 1B is a block diagram of a storage module that includes a plurality of non-volatile memory systems and a host.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
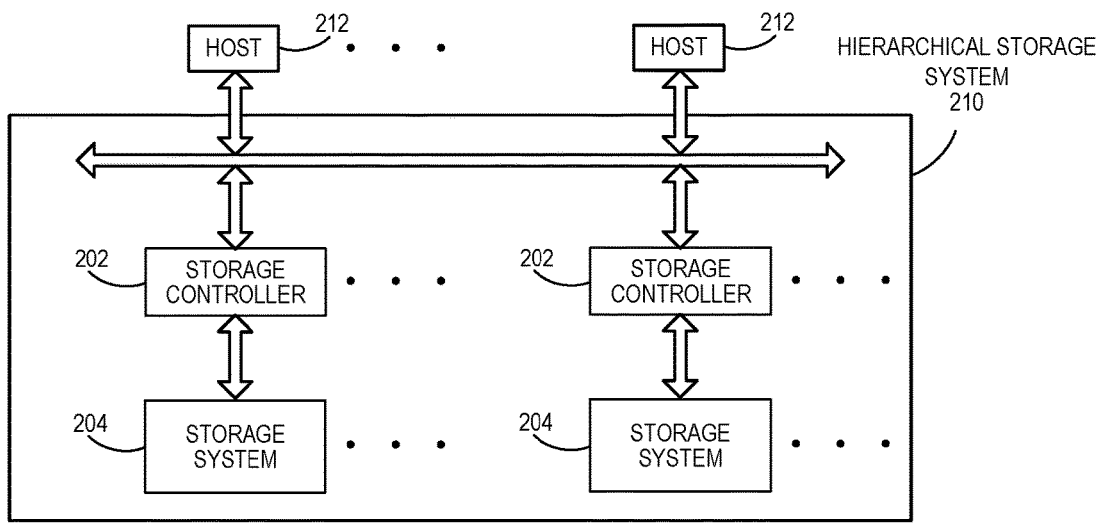
FIG. 1C is a block diagram of a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
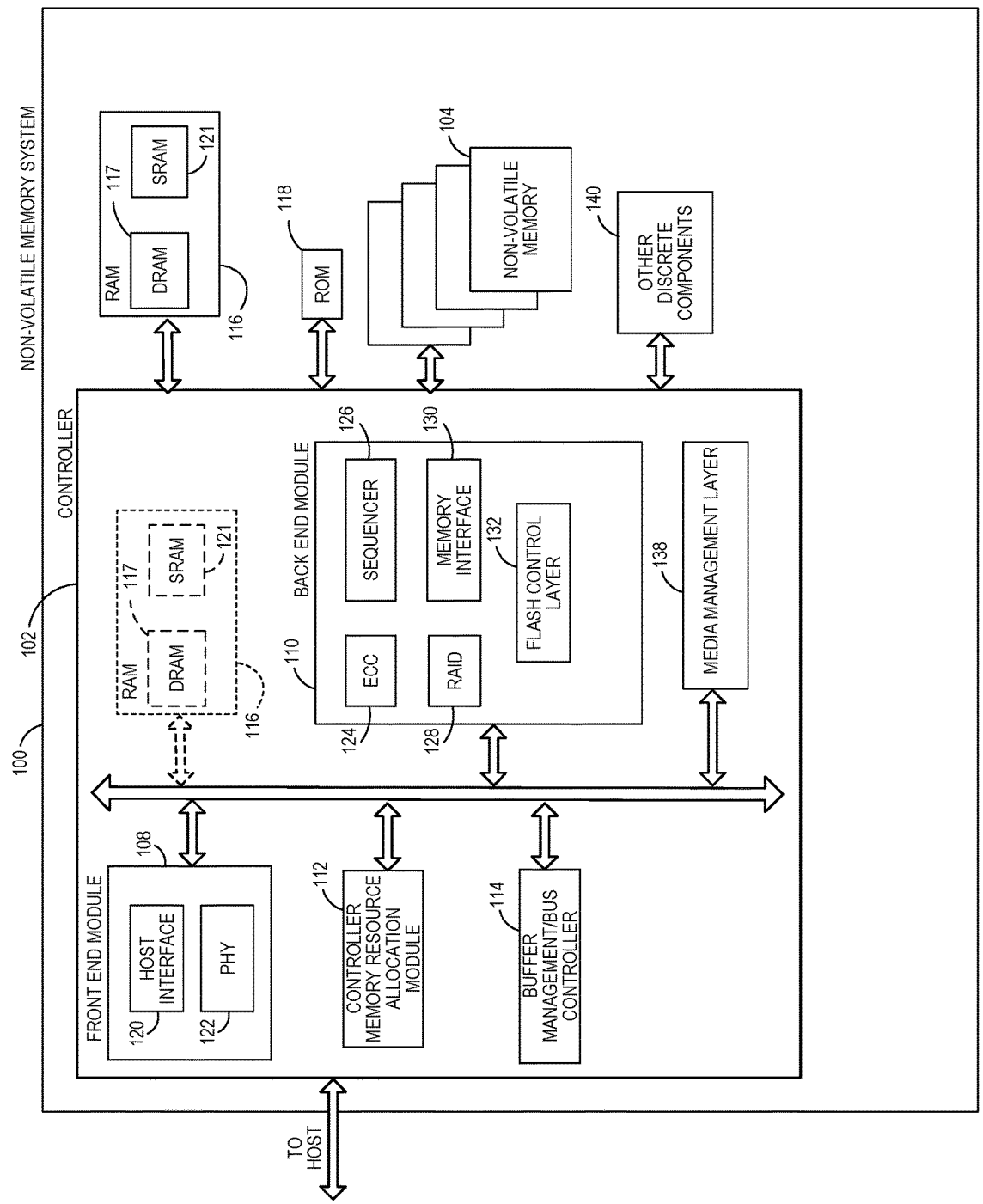
FIG. 2A is a block diagram of exemplary components of a controller of the non-volatile memory system of FIG. 1A.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a controller memory resource allocation module 112 present on the die of the controller 102. As described below, the controller memory resource allocation module 112 may provide functionality to a host utilizing a host writeable register in the controller 102 to dynamically allocate controller memory resources available to the host between a physical function and virtual functions running on the host, rather than rely on a predetermined memory device setting. As used herein, controller memory resources refers to controller memory space that the controller allows a host to directly access. In one implementation, the controller memory resources include CMB resources of the memory controller 102 that may be implemented in DRAM and SRAM in the memory device and PMR resources that may be implemented in non-volatile memory and DRAM or SRAM may be used as cache buffers for the PMR In the context of a memory device configured for a virtualized host using a NVMe standard, the controller memory resource allocation module 112 of the controller 102 may accomplish this by advertising a total amount of controller memory buffer (CMB)/persistent memory region (PMR) space of the controller 102 available to the host and then allowing the host to distribute those resources among its primary and virtual functions as desired. The controller memory resource allocation module 112, which in the context of a memory device using NVMe as described herein is dynamically allocation the CMB/PMR available to the physical and virtual functions of the host, may then use the host configured setting of the controller CMB/PMR resources to allow each host function (physical or virtual) a host-assigned portion of the resources during operation. The controller memory resource allocation module 112 may also alert the host when a change in the available CMB/PMR resources is necessary due to other hosts using the memory device or other hosts disconnecting from the memory device. In general, a function of a host may only use the amount of CMB/PMR resources it has been assigned and any such resources that are not utilized by the assigned function are simply idle/wasted. As described in greater detail below, in one aspect of the disclosed method and system, the host may cause the controller 102 to reallocate unused CMB/PMR resources.

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may consist of different types of RAM, such as dynamic RAM (DRAM) 117 and/or static RAM (SRAM) 121.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
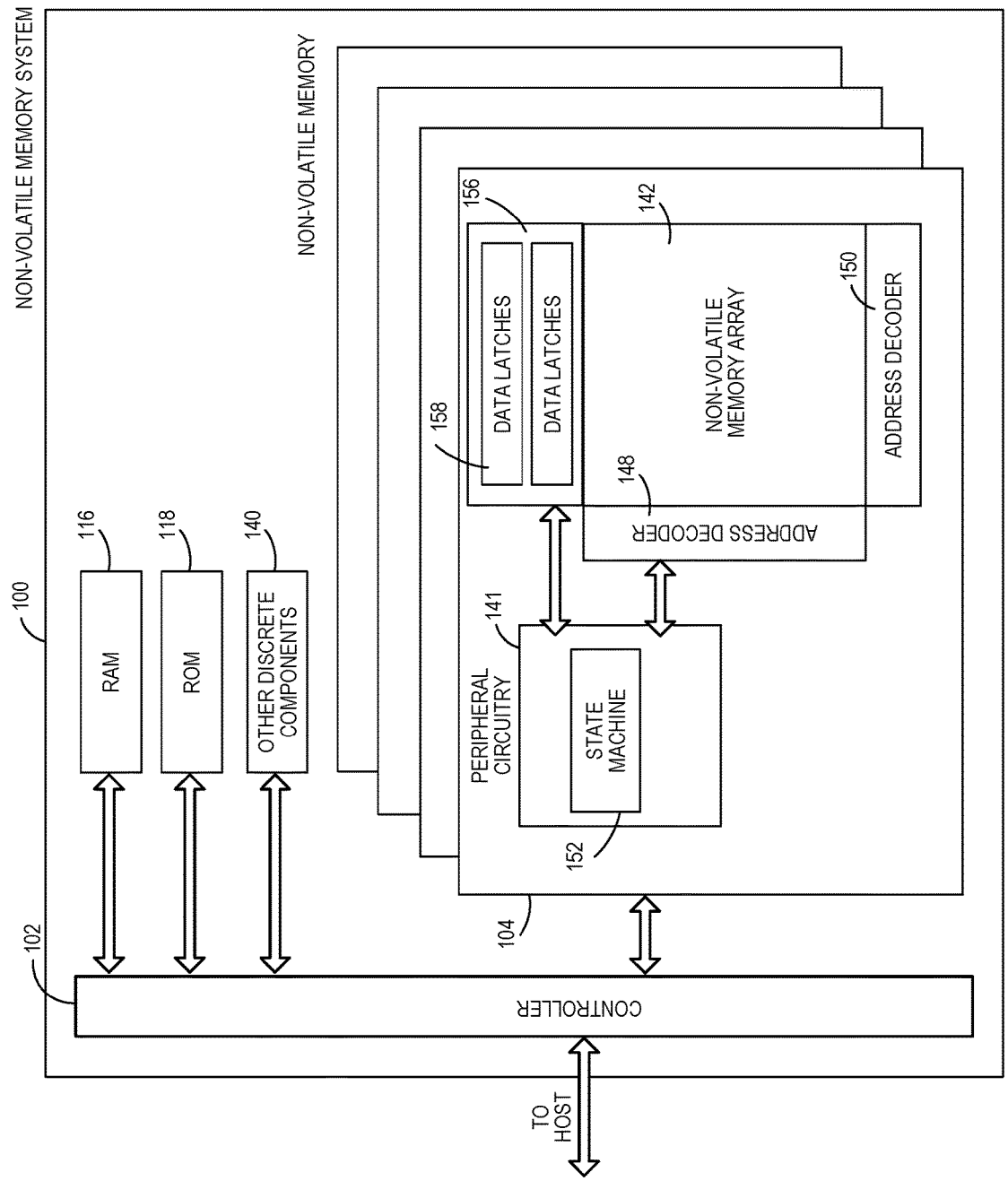
FIG. 2B is a block diagram of exemplary components of a non-volatile memory die of the non-volatile memory system of FIG. 1A.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and includes address decoders 148, 150. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
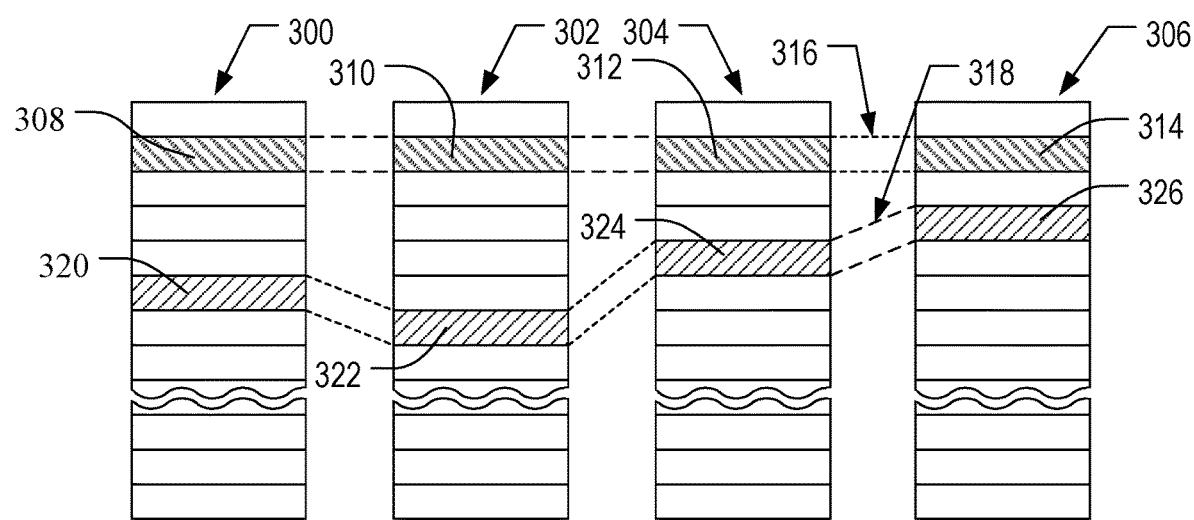
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
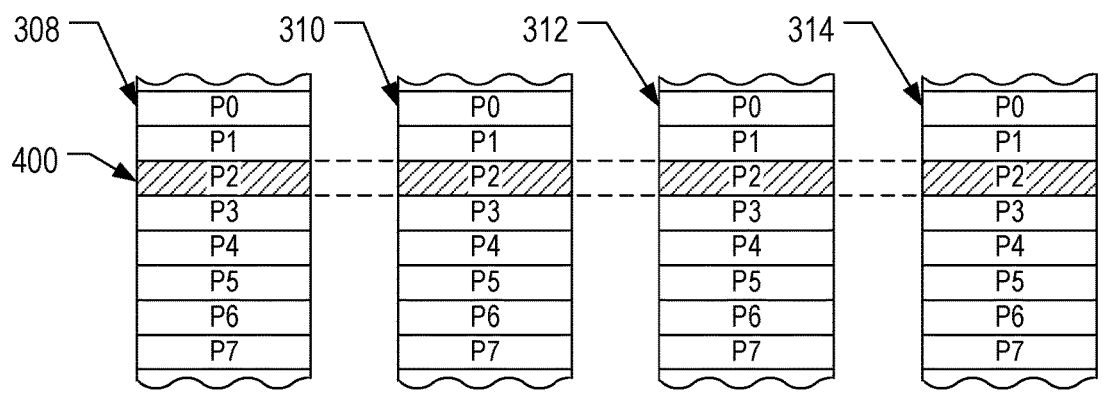
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the NVM system 100 where the data is physically stored.

Figure 5:
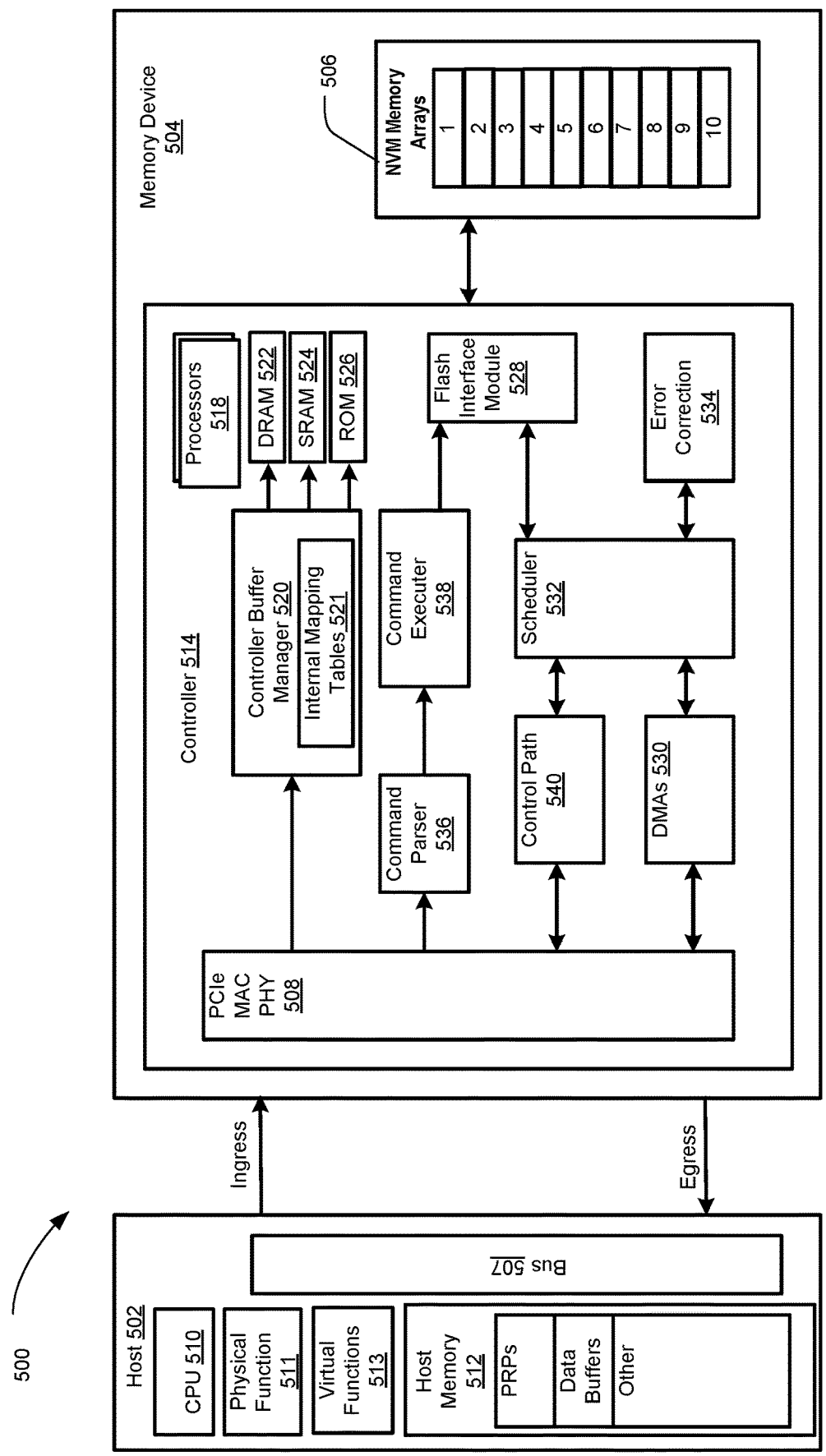
FIG. 5 is a block diagram of an embodiment of the storage device of FIG. 2A implementing peripheral component interface express (PCIe) and non-volatile memory express (NVMe) functionality.

A more detailed schematic illustration of an embodiment of the system of FIGS. 1-2 utilizing a PCIe interface and NVMe protocol is shown in FIG. 5. The system 500 includes a host 502 and a memory device 504 (also referred to as a storage device), such as a solid state drive (SSD). Host 502 may utilize a non-volatile memory (NVM) 506 included in memory device 504 to write and to read data, such as for long-term memory storage. Memory device 504 may be an internal storage drive, such as a notebook hard drive or a desktop hard drive. Memory device 504 may be a removable mass memory device, such as, but not limited to, a handheld, removable memory device, such as a memory card (e.g., a secure digital (SD) card, a micro secure digital (micro-SD) card, or a multimedia card (MMC)) or a universal serial bus (USB) device. Memory device 504 may take the form of an embedded mass memory device, such as an eSD/eMMC embedded flash drive, embedded in host 502. Memory device 504 may also be any other type of internal storage device, removable storage device, embedded storage device, external storage device, or network storage device.

Host 502 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 502 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 502 includes a central processing unit (CPU) 510 connected to a host memory space 512, such as DRAM or other main memories. An application program may be stored to memory space 512 for execution by components of the host 502.

Host 502 includes a bus 507, such as a memory device interface, which interacts with a host interface 508, which may include media access control (MAC) and physical layer (PHY) components, of memory device 504 for ingress of communications from host 502 to memory device 504 and egress of communications from memory device 504 to host 502. Bus 507 and host interface 508 operate under a communication protocol, such as a Peripheral Component Interface Express (PCIe) serial communication protocol or other suitable communication protocols. Other suitable communication protocols include Ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. Memory device 504 may also be connected to host 502 through a switch or a bridge. A single host 502 is shown connected with the memory device 504, and the SR-IOV single host virtualization protocol supported as discussed in greater detail below, where the memory device 504 may be shared by multiple hosts, where the multiple hosts may be a physical function 511 and one or more virtual functions 513 of a virtualized single physical host system. In other embodiments, it is contemplated that the MR-IOV standard for virtualizing multiple physical hosts may be implemented with features of the disclosed system and method.

The NVM 506 of memory device 504 may be configured for long-term storage of information as non-volatile memory space and retains information after power on/off cycles. In the same manner as described with respect to FIGS. 1-2, NVM 506 in FIG. 5 may consist of one of more dies of NAND flash memory. Other examples of non-volatile memory include phase change memories, resistive random access memory (ReRAM) memories, magnetoresistive random access memory (MRAM) memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in memory device 504. Each platter may contain one or more regions of one or more tracks of data. NVM 506 may include one or more types of non-volatile memory.

Memory device 504 includes a controller 514 which manages operations of memory device 504, such as writes to and reads from NVM 506. Controller 514 may include one or more processors 518, which may be multi-core processors. Processor 518 handles the components of memory device 504 through firmware code.

Controller 514 may operate under NVM Express (NVMe) protocol, but other protocols are applicable. The NVMe protocol is a communications interface/protocol developed for SSDs to operate over a host and a memory device that are linked over a PCIe interface. The NVMe protocol provides a command queue and completion path for access of data stored in memory device 504 by host 502.

Controller 514 also includes a controller buffer manager 520. Controller buffer manager 520 may be connected to a dynamic random access memory (DRAM) 522, to a static random access memory (SRAM) 524, and to a read-only memory (ROM) 526. The controller buffer manager 520 may also communicate with the NVM 506 through a flash interface module 528. DRAM 522 and SRAM 524 are volatile memories or cache buffer(s) for short-term storage or temporary memory during operation of memory device 504. Volatile memories do not retain stored data if powered off. DRAM generally requires periodic refreshing of stored data while SRAM does not require refreshing. While SRAM typically provides faster access to data than DRAM, it may also be more expensive than DRAM.

Controller 514 executes computer-readable program code (e.g., software or firmware) executable instructions (herein referred to as "instructions"). The instructions may be executed by various components of controller 514, such as processor 518, logic gates, switches, application specific integrated circuits (ASICs), programmable logic controllers, embedded microcontrollers, and other components of controller 514.

The instructions executable by the controller 514 for carrying out the embodiments described herein are stored in a non-transitory computer readable storage medium. In certain embodiments, the instructions are stored in a non-transitory computer readable storage medium of memory device 504, such as in a read-only memory (ROM) or NVM 506. Instructions stored in the memory device 504 may be executed without added input or directions from the host 502. In other embodiments, the instructions are transmitted from the host 502. The controller 514 is configured with hardware and instructions to perform the various functions described herein and shown in the figures.

Memory device 504 may also include other components, such as flash interface module 528, a direct memory access (DMA) module 530, a scheduler 532, an error correction module 534, a command parser 536, a command executor 538, and a control path 540. Flash interface module 528 interacts with the NVM 506 for read and write operations. DMA module 530 executes data transfers between host 502 and memory device 504 without involvement from CPU 510. Scheduler 532 controls the data transfer while activating the control path 540 for fetching physical page regions (PRPs), posting completion and interrupts, and activating the DMAs 530 for the actual data transfer between host 502 and memory device 504. Error correction module 534 corrects the data fetched from the memory arrays in the NVM 506. Command parser 536 parses commands to command executor 538 for execution on flash interface module 528.

Figure 6:
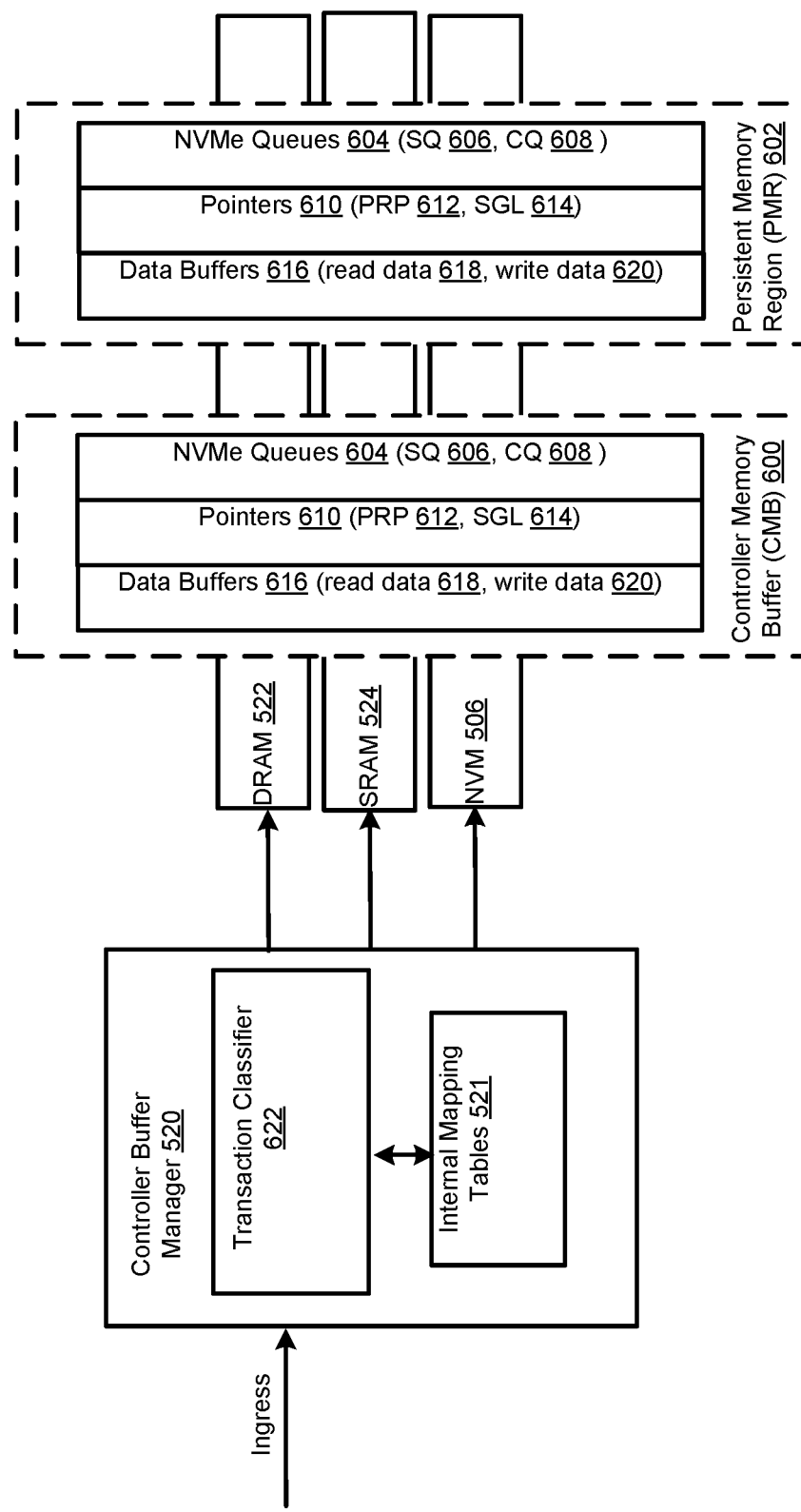
FIG. 6 is a schematic diagram illustrating one embodiment of a controller buffer manager of a storage device.

FIG. 6 is a schematic diagram illustrating of one embodiment of the controller buffer manager 520 of system 500 of FIG. 5, but other systems are possible. The controller buffer manager 520 manages data transactions between host 502 and a memory device 504 having a controller memory buffer (CMB) 600 and/or a persistent memory region (PMR) 602. CMB 600 and PMR 602 are controller memory spaces which may span across one or more of the DRAM 522, SRAM 524, and/or NVM 506. The contents in CMB 600 typically do not persist across power cycles and resets while the contents in PMR 602 persist across power cycles and resets. The CMB 600 and the PMR 602 have similar functions. However, the contents in PMR 602 persist across power cycles and resets and require storing in NVM 506.

One or more types of data structures defined by the NVMe protocol may be stored in the CMB 600 and/or the PMR 602 by controller buffer manager 520 or may be stored in host memory space 512 (FIG. 5). As described in greater detail below, the host 502 may initialize the CMB 600 and the PMR 602 prior to controller buffer manager 520 storing NVME data structures thereto. At initialization phase, memory device 504 may advertise to host 502 the capability and the size of CMB/PMR 600, 602 and may advertise which NVMe data structures may be stored into CMB/PMR 600, 602. For example, memory device 504 may store one or more of the NVMe data structures into CMB/PMR 600, 602, including NVMe queues 604 such as submission queues (SQ) 606, completion queues (CQ) 608, PRP lists 612, SGL segments 614, write data 620, read data 618, and combinations thereof.

In an embodiment of the memory device 504, the controller 514 advertises the CMB 600 and PMR 602 availability only to the physical function of a virtualized host 502, where a virtualized host 502 has a single physical function 511 and one or more virtual functions 513. Also, the advertised CMB 600 and PMR 602 availability may be in the form of a total CMB and PMR size available for all functions (physical and any virtual functions) such that the physical function 511 may selectively assign itself and all other virtual functions 513 any desired portion of the advertised total CMB and PMR size available.

As discussed further below, the controller of the memory device may then store the physical function selected portions of the available CMB and PMR in NVMe registers dedicated to each physical function 511 and virtual function, respectively. The virtual function may store a different relative portion size of the advertised CMB and PMR size in each NVMe register to account for the different needs the physical function 511 sees for itself and each virtual function. Once the physical function 511 assigns the different amounts and regions of the advertised PMR and CMB available for host access (e.g. for direct access by the primary and virtual functions) during the initiation stage, these settings may be managed by the controller 514 to provide access to the respective primary or virtual functions during operations of the memory device.

Controller buffer manager 520 may include a transaction classifier module 622 to classify received host write transactions to CMB/PMR 600, 602. Host write transactions to CMB/PMR 600, 602 may be associated with host write command and host read commands.

In certain embodiments, transaction classifier module 622 may classify the host write transactions into one of the three NVM data structure groups of NVMe queues 604, pointers 610, and data buffers 616. NVMe queues 604 include host submission queues (SQ) 606 and host completion queues (CQ) 608. Pointers 610 may include physical region pages (PRP) lists 612 and scatter gather list (SGL) segments 614. PRP lists 612 contain pointers indicating physical memory pages populated with user data or going to be populated with user data, such as for read or write commands in NVMe queues 604. SGL segments 614 include pointers indicating the physical addresses of host memory space 512 in which data should be transferred from for write commands and in which data should be transferred to for read commands. Data buffers 616 may contain write data 620 to be written to NVM 506 associated with a write command contain and/or read data 618 from memory device 504 associated with a read command.

In certain embodiments, NVMe queues 604, pointers 610, and data buffers 616 associated with a particular command may be stored in the CMB 600 and/or PMR 602 by controller buffer manager 520 to reduce command execution latency by the memory device 504. For example, a host command entry written to SQs 606 implemented CMB/PMR 600, 602 avoids fetching of the host command entry through the PCIe fabric which may include multiple switches if the SQ is located in host memory space. PRP lists 612 and SGL segments 614 written to CMB/PMR 600, 602 of memory device 504 avoids a separate fetch of the PRP lists 612 and SGL segments 614 through the PCIe fabric if the PRP lists and SGL segments are located in host memory space. Write data 620 written to CMB/PMR 600, 602 of memory device 504 avoid having memory device 504 fetch the write data from host memory space 512.

Figure 7A:
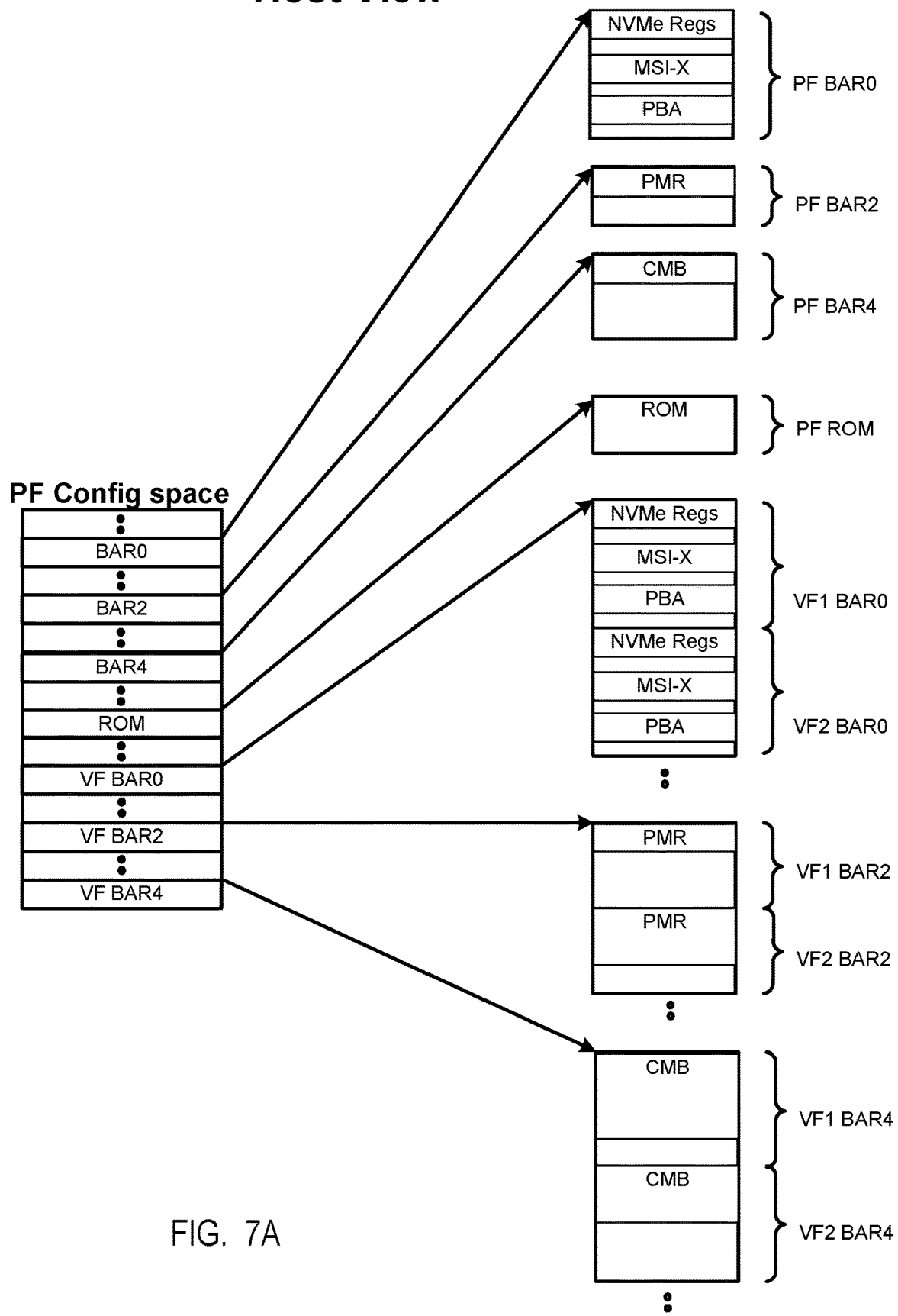
FIG. 7A is a schematic diagram illustrating an embodiment of a distribution of NVMe base address registers and from the perspective of a host device.
Figure 7B:
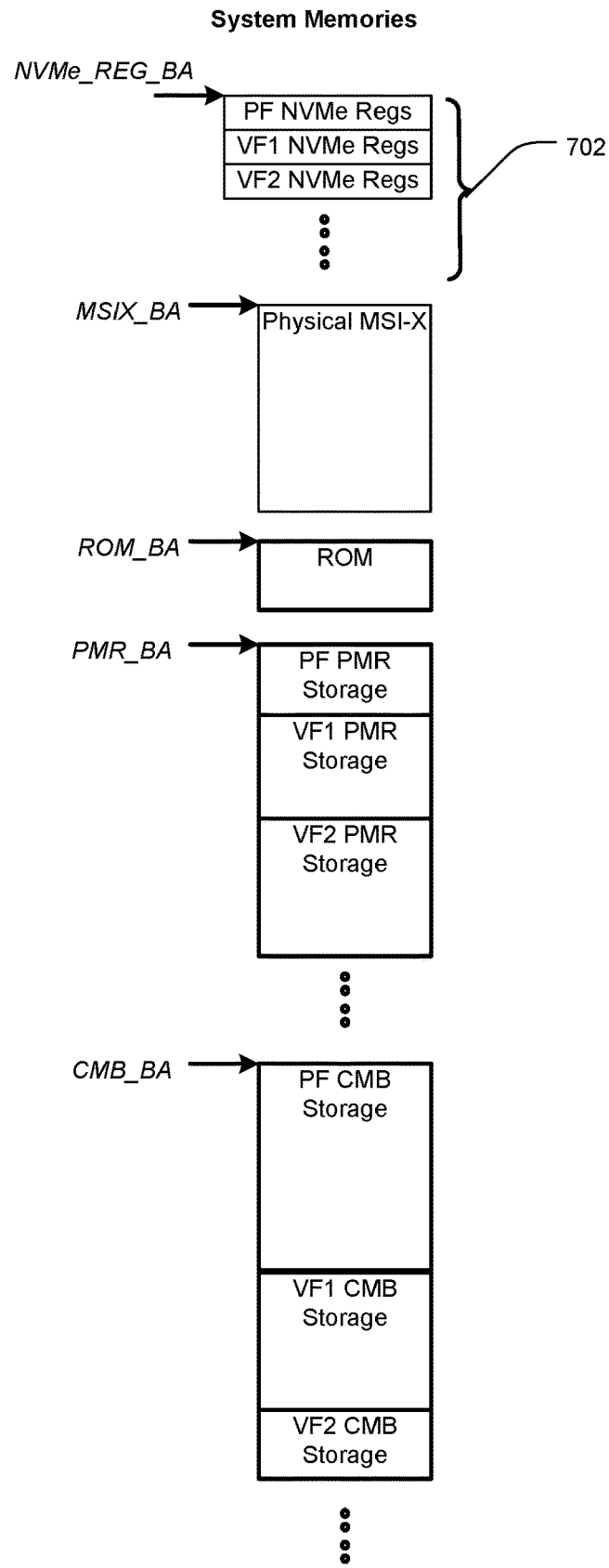
FIG. 7B is a schematic diagram illustrating an embodiment of the distribution of NVMe base address registers and system memory from the perspective of a storage device.

FIGS. 7A and 7B illustrate a host view (FIG. 7A) and a memory device view (FIG. 7B) of the PCIe base address registers (BARs) with a focus on the CMB 600 and PMR 602 organization. In one implementation, as shown in FIG. 7B, the CMB 600 from the memory device's point of view is a contiguous buffer while from host point of view in FIG. 7A this might not be the case because each function on the virtualized host sees only its assigned portion of the CMB 600. The same applies for the PMR 602, where a contiguous buffer in PMR space is maintained in the memory device but appears to the various primary and virtual functions on the host as discrete groups of PMR. Although the CMB 600 and PMR 602 may be non-contiguously stored in other embodiments, a contiguous storage implementation may simplify implementation and reduce the size of the CMB and PMR mapping table 521 illustrated in FIGS. 5 and 10. The CMB 600 and PMR 602, when implemented as non-contiguous storage space, may be more readily spread across different memory types and may be somewhat easier to reallocate when a physical function 511 wants to re-allocate only some CMB or PMR resources outside of a power reset of the entire memory device. In a non-contiguous implementation each VF CMB would include several entries in the table illustrated in FIG. 10 and CMB/PMR PF/VF IDs would be needed for each entry.

In a virtualized environment, from the host point of view of FIG. 7A there is a single physical function (PF) 511 and many virtual functions (VFs) 513. In the PF configuration space 700, the defined NVMe base address registers (BARs) are divided into PF BARs (BAR0, BAR2 and BAR4, for example) and then VF BARs (VF BAR0, VF BAR2 and VF BAR4, for example). Thus, the PF has its own BAR0 memory space. For the VFs there is a single BAR0 start address and single size which represents the size of a single VF BAR0. The BAR0 memory space for each of the VFs are stored one after the other in a continuous way while each chunk has the same size as the others. Each BAR0 holds the NVMe registers including the doorbells, message signaled interrupt (MSI-X in PCIe) table and physical block address (PBA) registers (in one embodiment) associated with the particular PF or VF.

A similar arrangement of VF-specific and PF-specific address registers applies to BAR2 and BAR4. The PF has its own BAR2 and BAR4, and BAR2 and BAR4 size configurations. For the VFs there is a single BAR2 start address and single size which represents the size of a single VF BAR2, as well as a single BAR4 start address and single size which represents the size of a single VF BAR4. The BAR2 for each VF is stored one after the other in a continuous manner while each chunk has the same size. Similarly, the BAR4 for each VF is stored one after the other in a continuous way and each VF's BAR4 has the same size. In one embodiment, each BAR4 contains the CMB if supported for the relevant PF or VF. The start offset of each CMB in the BAR4 is fixed in this embodiment and equal to 0. However, the size of each CMB might be different from the others. In one embodiment, each BAR2 contains the PMR if supported for the relevant PF or VF. The start offset of each PMR in the BAR2 is also fixed and equal to 0 in this embodiment. However, the size of each PMR might be different from the others.

Only the PF supports the eROM which has its own BAR (PF ROM) configuration and size. The eROM is a defined BAR for implementing PCI Expansion ROM. PCI Expansion ROM is a code, executed during BIOS initialization, that initializes certain types of PCI/PCI Express devices. The Expansion ROM is an address in Host memory configured via the eROM BAR (PF ROM). The PCI Expansion ROM code is fetched from host memory and cached in the storage device using the internal address of the ROM.

As shown in FIG. 7B, all CMBs associated with the various PF and VFs are implemented in a contiguous buffer in SRAM or DRAM in order to simplify the implementation in one embodiment. The same constraint applies to the PMR in one embodiment, such that in one implementation all PMRs for each of the VFs are contiguously stored in volatile memory. In alternative embodiments the PMR may be spread across volatile memory and non-volatile memory. The address translation of host BAR addresses to internal storage device address may be implemented in a pipeline in order to improve performance. This pipeline approach means that, for each address translation port which is connected to a different hardware module, a new request could be handled every cycle.

Figure 8:
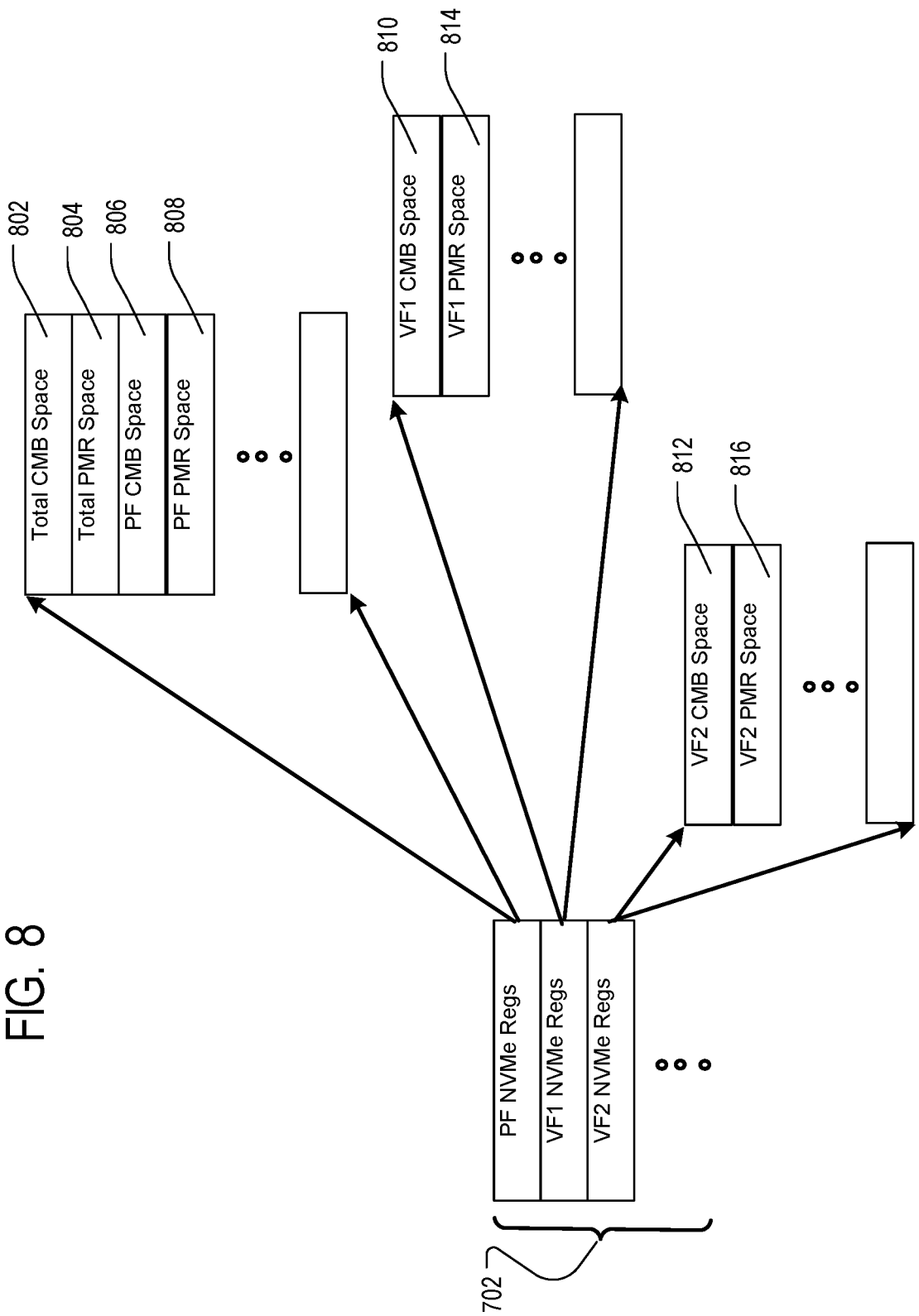
FIG. 8 is a schematic diagram of an embodiment of NVMe configuration registers for allocating shared controller memory resources to a physical function and each virtual function of a virtualized host.

Referring to FIG. 8, a more detailed view of an embodiment of the contents of the NVMe registers 702 maintained by the memory device is shown. The physical function NVMe registers (PF NVMe Regs) in the memory device may include a total CMB space register 802 where the controller of the memory device stores a total amount of controller memory buffer space available in the memory device for the PF and the VFs. Similarly, the PF NVMe Regs may also include a separate total PMR space register 804 for the memory device to store the total amount of PMR space available in memory device that may be distributed among the PF and the VFs. The total CMB space register 802 and the total PMR space register 804 may be populated by the controller at power-up/initialization of the memory device and, in this manner, the controller advertises to the host what the CMB and PMR availability is. However, in another embodiment, more flexibility may be provided to the host by defining several registers. For example, in one implementation the total CMB may be located only in SRAM and total CMB only in DRAM. Then, the host can allocate the available CMB and PMR space to PF/VFs as required. In general, SRAM has low latency and high performance when comparing to DRAM.

In addition to the registers for total CMB space 802 and total PMR space 804, the PF NVMe Regs may include the allocation amount registers, PF CMB Space register 806 and PF PMR Space register 808, showing the amount and location of the total CMB and PMR space that is assigned to the PF. The PF CMB space register 806 and PF PMR space register 808 are preferably registers writable by the host (PF of a virtualized host) such that the PF may set the amount of CMB and PMR space (of the total amount of CMB and PMR space the PF sees advertised in the total CMB space register 802 and Total PMR space register 804) the PF sees as necessary for itself at the initialization stage of the memory device.

The NVMe registers 702 may also include sets of registers for each virtual function, such as for a first VF (VF1 NVMe Regs) and a second VF (VF NVMe Regs) as shown. Included in these sets of registers for each VF are a CMB space register (VF1 CMB space register 810, VF2 CMB space register 812) and a PMR space register (VF1 PMR space register 814, VF2 PMR space register 816) that are also configured as PF writable. The PF may allocate CMB and/or PMR space to each VF at initialization by providing the amount and location of the CMB and/PMR that the PF is assigning to the specific VF through writing to the respective CMB space register 810, 812 or PMR space register 814, 816 of the selected VF. Because the registers for the total CMB space register 802, the total PMR space register 804, and the host writeable VF CMB and PMR registers 810, 812, 814, and 816 discussed above are not part of the NVMe standard, they may be created from extra register space in the NVMe standard generally reserved for vendor specific use. The PF 511 may use the various host writeable registers described above as configuration registers to assign different portions of the total available CMB or PMR space it wishes to assign to itself and the one or more VFs.

The formatting of the total CMB space register 802 and total PMR space register 804 may be implemented in any number of ways. One implementation of the structure of these registers is shown in FIG. 9. The register structure 902 of the total CMB space and total PMR space registers, as well as the PF and VF CMB Space and PMR space registers 802-816, may be the same and include 2 entries 904, 906, each having 4 fields. The first entry 904 may be the size entry identifying the total size of the CMB (for the total CMB space register) or PMR (for the total PMR space register), and the second entry 906 identifying the units of size to be used by the first entry 904. Each entry 904, 906 may include a bit location field 908, a register type field 910 a reset capability field 912 and the description field 914.

In one embodiment, unlike a standard NVMe size register which is read-only for a host, the register type field 910 is set as a host physical function read and write capable register (as shown in FIG. 9) in the PF and VF CMB Space and PMR space registers 806-816, while both the total CMB space register 802 and the total PMR register 804 implementations have the register type field 910 set to read only (RO) for the host PF because the host PF must stay within the total resource bounds set by the memory device in those registers. For the size entry 904, the description field 914 may include the size of the available controller resource (total CMB for the memory device for the total CMB size register or total PMR for the total PMR space register) listed as a multiple of the granularity of field size stored in the description field 914 of the second entry 906. Other register structures may be used and the register structure 902 for PF read only capable registers containing total CMB or total PMR space for the memory device.

During initialization of the memory device, and after the host designated CMB and PMR resource amounts are received from the PF and stored by the controller into the appropriate PF or VF CMB space register 806, 810, 812 and PF or VF PMR space register 808, 814, 816, the controller 514 also generates internal mapping tables 521 for use by the controller buffer manager 520 to map PF and VF data to the correct CMB or PMR locations in controller memory DRAM 522 or SRAM 524. The mapping table 521 itself is typically stored in flip-flops or DRAM of the memory device to reduce or eliminate any latency issues. In one implementation, the mapping table may have entries for the PF and each VF formatted as indicated in FIG. 10. The mapping table entry format 1000 in FIG. 10 illustrates the set of 4 fields 1002 and respective field sizes 1004 that may be indexed by the function ID associated with particular command. For example, each of the PF and VFs may be assigned a unique PF/VF function ID that the controller buffer manager 520 can use to look up the appropriate location of any CMB or PMR allocated to that VF or PF in the internal mapping tables 521. In other implementations where a non-contiguous PMR and CMB is permitted, the mapping table format of FIG. 10 may be modified to include a 32 bit address field to allow for a full address rather than just the offset address needed for the contiguous implementation. While allowing more flexibility for allocating memory space, the full address of the non-contiguous implementation of CMB and PMR would require more complexity. For example a search function would need to be used whenever a host transaction is sent to the CMB as part of the address translation logic.

Using the received function ID, the controller buffer manager 520 can determine where in the CMB or PMR to look to or write to for a command associated with a function ID. As shown in FIG. 10, a CMBS field identifies a 16 bit field that stores the size of the space in the CMB that is associated with the function ID, as well as a CMBO field of 16 bits identifying the offset in the contiguous CMB buffer space (See FIG. 7B) where the CMB resources for that function ID begin. Similarly, the entry in the mapping table 521 for that same function ID may also include a PMRS field of 16 bits in width identifying the size of the PMR available to that function ID and a PMRO field of 16 bits in width with the offset in the contiguous PMR buffer space (see FIG. 7B) where the portion of the total PMR assigned to the function ID is located. Using this mapping table entry format 1000 the granularity of the CMB and PMR sizes, as well as the CMB and PMR offsets in each entry of the mapping table 521 may be 4 KB in one implementation, however other granularities may be used. The particular mapping table entry format 1000 of FIG. 10 is one of many contemplated formats. Other mapping table entry fields, sizes and configurations are also contemplated.

An advantage of keeping the total amount of CMB space in contiguous physical locations, and any portion of CMB allocated to a particular PF or VF contiguous, is that the mapping table 521 may be simplified to a single size and a single offset field for the CMB and PMR in each entry. This same advantage in simplified mapping applies to embodiments of contiguous PMR space and contiguous portions of PMR being allocated to the PF or VFs.

It should be noted that the host-designated allocation of the CMB and PMR may be the same or different for the physical function 511 and each virtual function, as long as the individual allocations of CMB and PMR add up to no more than the total amount of CMB and total amount of PMR advertised as available by the memory device to the host (in this case the physical function 511 of the virtualized host at initialization of the memory device). In another embodiment, PF may send a virtualization management command to storage device in order to allocate CMB/PMR to the PF/VFs. Based on this command, the memory device configures appropriately the VF PMR/CMB registers.

Figure 11:
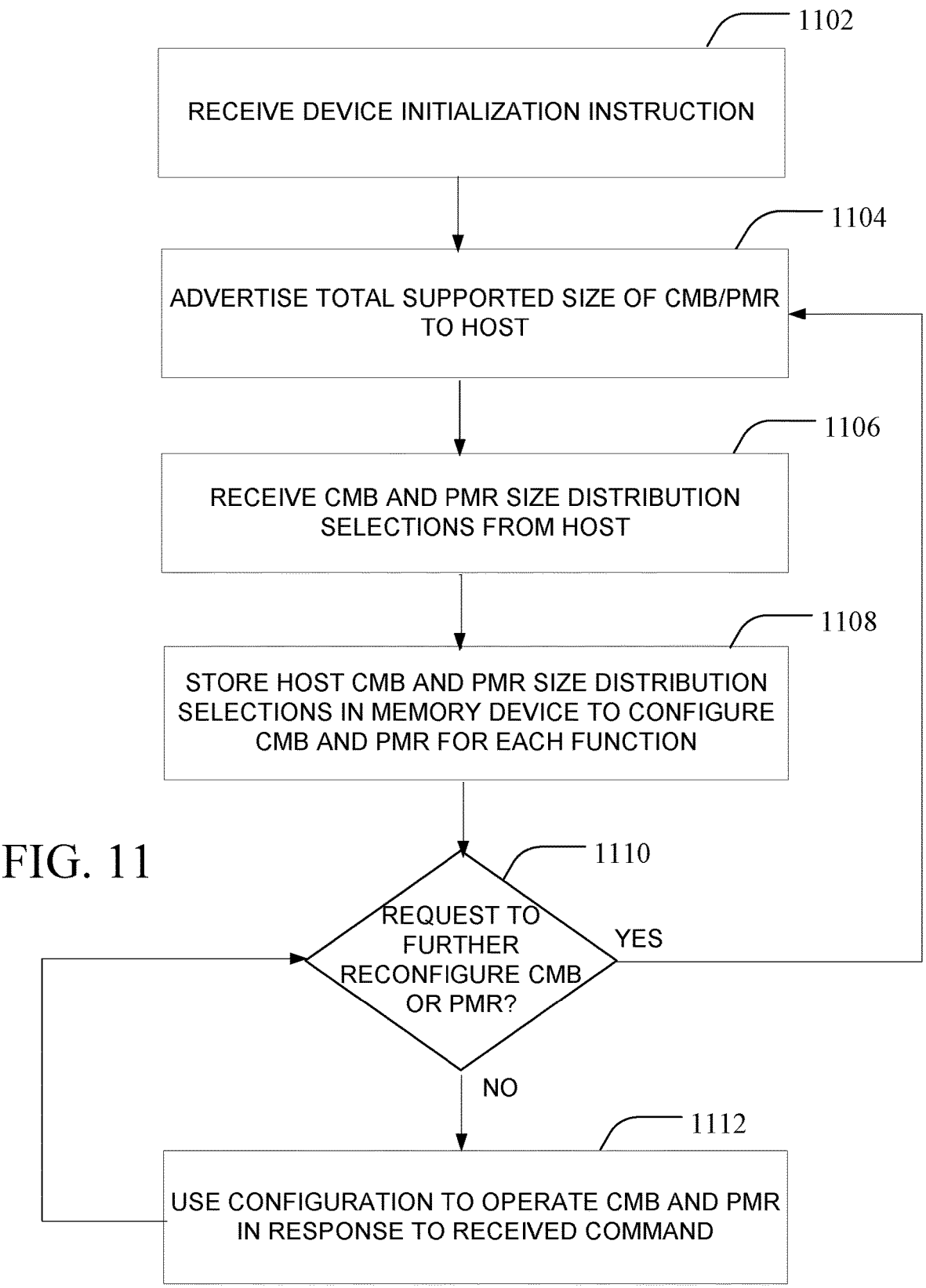
FIG. 11 is a flow chart illustrating a method of dynamically allocating shared controller memory resources to a virtualized host in an NVMe environment.

Referring now to FIG. 11, a method of dynamically allocating shared controller memory resources to a virtualized host in an NVMe environment is described. The method of FIG. 11 may utilize, for example, the system of FIGS. 5-6 and the address register arrangements and configurations described in FIGS. 7-10. The process of FIG. 11 begins with the controller 514 of the memory device 504 receiving an instruction to enter and initialization phase to configure the memory device 504 (at 1102). The initialization instructions may arrive in the form of routine commands for initializing the memory device that are automatically triggered by power up of the memory device. Alternatively, the memory device may be triggered to initialize CMB and PMR space via the physical function 511 of the host 502 sending an express request to the memory device. The physical function-initiated request to reconfigure CMB and PMR resources may be sent via one or more vendor configurable fields of virtual management commands supported by the NVMe standard.

NVMe initialization phase starts after power up of the memory device and PCIe initialization done. Then, the physical function 511 of the host 502 reads the memory device NVMe registers in order to get the capability of the device. Next, the physical function 511 of the host 502 may issue admin commands such as Identify and Get features. Using this information, the physical function 511 on the host 502 learns what the maximum total CMB/PMR sizes are. When the memory device 504 recognizes the command or trigger and enters initialization phase, the controller 514 advertises to the host a total amount of controller resources that the host may dedicate to the physical and virtual functions 511, 513 of the host (at 1104). As noted previously, in an NVMe environment the advertisement of controller resources may be accomplished by the controller buffer manager 520 populating dedicated NVMe registers 702 in the controller memory, such as a total CMB space register 802 and a total PMR space register 804, with the total amount (size) of the space in the CMB 600 and the space and PMR 602 in the controller 514 usable by all of the functions of the virtualized host 502.

The PF of the virtualized host 502 may then read the total CMB space register 802 and the total PMR space register 804 and decide how it wishes to distribute these available controller resources of CMB and PMR space among itself and the other VFs supported by the host 502. As noted previously, a PCIe extension, such as single root input/output virtualization (SR-IOV), may be used to allow a single physical host to operate as a virtual machine with a PF and multiple VFs operating essentially as separate respective "hosts" to the memory device, each with separate access to the memory device through a single PCIe interface. The PF knows at initialization what the resource needs are for itself and each VF it is associated with. The PF, with the knowledge of the various PF and VF resource needs decides how it wishes to allocate the advertised CMB and PMR resources of the memory device and transmits its allocation decisions to the memory device. In one implementation, the PF from the host 502 transmits its CMB and PMR allocation selections to the memory device using a virtualization management message/command that the memory device controller receives and then stores in the appropriate PF or VF allocation register (such as the PF CMB and PMR space registers 806, 808 and VF1 CMB and PMR space registers 810, 814) (at 1106, 1108). Thus, instead of a default fixed distribution of CMB and PMR resources among the PF and VFs by the memory device without any host (PF) input, the method of FIG. 11 allows the PF to select allocations of CMB and PMR for itself and the VFs and store those in the memory device. The allocations may be in any amount as long as the total amount of CMB and PMR allocated is not more than the total amount advertised as available by the memory device. The allocation of the controller CMB and PMR resources by the PF may be equal among the PF and VFs or may be unequal where one of the VFs receives the majority of the allocation and the PF or other VFs receive little, or even no, allocation of CMB or PMR space. Any combination of PF selected allocation amounts for the CMB and PMR may be dynamically selected by the PF based on the needs of the know PF and VFs at initialization. In another embodiment, the host may prefer using some part of PMR storage as a CMB extension. This operation is allowed, however trying to take a portion of the CMB and use it as PMR is not permissible because the CMB is not memory that is preserved during reset and would therefore not be suitable as a substitute for data that needs persistent storage.

Once the allocation registers for the PF and VFs are updated by the controller to reflect the VF selections, the initialization phase ends and the controller uses the CMB and PMR settings to operate on incoming commands from the PF and VFs according to those settings (at 1112). This continues unless there is a request from the host for resetting the current setting and reinitializing the memory settings (at 1110), where the process of advertising the resources and receiving the allocation settings from the PF is repeated (at 1104-1108). The normal operation of the memory device after the initialization phase of configuring the controller memory resources (e.g., CMB and PMR) according to the host requests may include using the mapping tables 521 to identify by function ID where commands to store or fetch NVMe submission queue, completion queue or other NVMe data, in the controller memory areas.

Although NVMe and PCIe specific features and modifications have been discussed in detail, the techniques and systems described herein may be applied to other protocols and interfaces in other embodiments. Also, although specific memory types were described in the examples above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for a memory device to dynamically configure an amount of controller memory resources located on the memory device, wherein the controller memory resources comprise a controller memory buffer (CMB), the method comprising the memory device:
    detecting a memory device initialization trigger;
    in response to detecting the memory device initialization trigger, communicating to a physical function of a virtualized host a total amount of controller memory resources on the memory device that are available for use by the physical function and any virtual functions in communication with the memory device by updating a physical function register on the memory device with an amount of CMB space available for all functions of the virtualized host;
    receiving, from the physical function, a controller memory resources configuration setting identifying both a first portion of the controller memory resources located on the memory device to be reserved for the physical function and a second portion of the controller memory resources located on the memory device to be reserved for a virtual function;
    storing the received controller memory resources configuration setting on the memory device identifying the first portion and the second portion; and
    accessing the first portion in response to received commands identifying the physical function, and accessing the second portion in response to received commands identifying the virtual function, in accordance with the received controller memory resources configuration setting.

2. The method of claim 1, wherein:
    the memory device further comprises a physical function CMB configuration register and a virtual function CMB configuration register; and
    storing the controller memory resources configuration setting comprises the memory device:
        storing the first portion of the controller memory resources located on the memory device to be reserved for the physical function in the physical function CMB configuration register; and
        storing the second portion of the controller memory resources located on the memory device to be reserved for the virtual function in the virtual function CMB configuration register.

3. The method of claim 1, wherein the controller memory resources located on the memory device further comprise a persistent memory region (PMR).

4. The method of claim 3, wherein the memory device communicates the total amount of controller memory resources on the memory device that are available for use by the physical function and any virtual functions by:
    updating a physical function CMB register on the memory device with an amount of CMB space available for all physical and virtual functions in communication with the memory device; and
    updating a physical function PMR register on the memory device with an amount of PMR space available for all physical and virtual functions in communication with the memory device.

5. The method of claim 4, wherein:
    the memory device further comprises a physical function CMB configuration register, a physical function PMR configuration register, a virtual function CMB configuration register, and a virtual function PMR configuration register;
    the first portion of the controller memory resources comprises a first amount of CMB space and a first amount of PMR space;
    the second portion of the controller memory resources comprises a second amount of CMB space and a second amount of PMR space; and
    storing the controller memory resources configuration setting comprises the memory device:
        storing the first amount of CMB space in the physical function CMB configuration register;
        storing the first amount of PMR space in the physical function PMR configuration register;
        storing the second amount of CMB space in the virtual function CMB configuration register; and
        storing the second amount of PMR space in the virtual function PMR configuration register.

6. The method of claim 5, wherein storing the controller memory resources configuration setting comprises storing the controller memory resources configuration setting in a volatile memory of a controller of the memory device.

7. The method of claim 1, wherein the memory device comprises a three-dimensional memory.

8. A non-volatile memory device comprising:
    a non-volatile memory having a plurality of memory cells;
    a communication interface configured to communicate with a host device, wherein the host device comprises a virtualized host device having a physical function and at least one virtual function; and
    a controller in communication with the non-volatile memory and the communication interface, the controller configured to:
        during an initialization phase of the non-volatile memory device:
            advertise to the host device a total amount of available controller memory resources on the non-volatile memory device that are available for use by the host device, wherein the available controller memory resources comprise a controller memory buffer (CMB); and
            store a controller memory resources configuration setting received from the host device in a host writeable controller memory resource size register, wherein the controller memory resources configuration setting relates to a portion of the total amount of available controller memory resources selected by the host device for a respective one of the physical function and the at least one virtual function.

9. The non-volatile memory device of claim 8, wherein the controller memory resources configuration setting comprises both a first portion of the controller memory resources located on the memory device to be reserved for the physical function and a second portion of the controller memory resources located on the memory device to be reserved for the at least one virtual function.

10. The non-volatile memory device of claim 8, wherein the controller memory buffer (CMB) comprises contiguous controller volatile memory.

11. The non-volatile memory device of claim 8, wherein the available controller memory resources further comprise a persistent memory region (PMR).

12. The non-volatile memory device of claim 11, wherein the plurality of host writeable controller memory resource size registers comprise:
 a first set of host writeable controller memory resource size registers for storing a host determined portion of CMB resources for each of the physical function and each virtual function of the at least one virtual function; and
 a second set of host writeable controller memory resource size registers for storing a host determined portion of PMR resources for each of the physical function and each virtual function of the at least one virtual function.

13. The non-volatile memory device of claim 9, wherein the controller is further configured to, after the initialization phase of the non-volatile memory device, operate the controller memory resources based on the controller memory resources configuration setting.

14. The non-volatile memory device of claim 8, wherein the non-volatile memory comprises a three-dimensional memory.

15. A non-volatile memory device comprising:
 a non-volatile memory having a plurality of memory cells;
 a communication interface configured to communicate with a virtualized host device; and
 a controller in communication with the non-volatile memory and the communication interface, the controller configured to:
  present a total amount of controller memory resources available for the virtualized host device to share between a physical function and a plurality of virtual functions supported by the virtualized host device, wherein the controller memory resources comprise a controller memory buffer (CMB);
  store a host assigned allocation amount of the total amount of controller memory resources for each of the physical function and the plurality of virtual functions by updating a physical function register on the memory device with an amount of CMB space available for all functions of the virtualized host device; and
  generate a mapping table indexed by physical function and virtual function identifiers, wherein the mapping table comprises a size and an offset in each of a plurality of types of controller memory resources allocated by the physical function of the virtualized host device to the physical function and each of the plurality of virtual functions of the virtualized host device.

16. The non-volatile memory device of claim 15, wherein the CMB is stored in contiguous random access memory in the controller.

17. A non-volatile memory device comprising:
 a communication interface comprising an ingress path and an egress path;
 a non-volatile memory having a plurality of memory cells;
 memory device configuration means for, during an initialization phase of the non-volatile memory device:
  presenting a total amount of controller memory resources available for host use to a virtualized host, wherein the controller memory resources comprise a controller memory buffer (CMB); and
  storing host-selected allocation amounts of the total amount of controller memory resources for each of a physical function and a plurality of virtual functions of the virtualized host by updating a physical function register on the memory device with an amount of CMB space available for all functions of the virtualized host; and
 means for sharing the total amount of controller memory resources among the physical function and the plurality of virtual functions according to the host-selected allocation amounts.

18. The non-volatile memory device of claim 17, wherein the non-volatile memory comprises a three-dimensional memory.

19. The non-volatile memory device of claim 15, wherein the non-volatile memory comprises a three-dimensional memory.

* * * * *